United States Patent [19]

Frantom et al.

[11] 4,350,368
[45] Sep. 21, 1982

[54] PASSIVE SEAT BELT SYSTEM FOR THREE OCCUPANT SEAT

[75] Inventors: Richard L. Frantom, Richmond; Robert L. Stephenson, Utica; Rudy V. Thomas, Sterling Heights, all of Mich.

[73] Assignee: Allied Corporation, Morris Township, Morris County, N.J.

[21] Appl. No.: 138,956

[22] Filed: Apr. 10, 1980

[51] Int. Cl.³ .......................................... B60R 21/10
[52] U.S. Cl. .................................................. 280/804
[58] Field of Search ............... 280/804, 802, 807, 803, 280/808

[56] References Cited

U.S. PATENT DOCUMENTS

| | | | |
|---|---|---|---|
| 2,858,144 | 10/1958 | Oppenheim | 280/804 |
| 3,940,164 | 2/1976 | Non | 280/804 |
| 4,235,456 | 11/1980 | Shakespear | 280/804 |

*Primary Examiner*—Robert R. Song
*Attorney, Agent, or Firm*—Roger H. Criss

[57] ABSTRACT

A passive seat belt system wherein the inboard upper anchor point for the seat belt of the outboard passenger and the upper anchor point for the seat belt of the center passenger are commonly located in the roof of a vehicle, and are commonly movable from a rearward position of passenger restraint to a forward position permitting easy egress and ingress to the seating positions.

18 Claims, 2 Drawing Figures

4,350,368

PASSIVE SEAT BELT SYSTEM FOR THREE OCCUPANT SEAT

BACKGROUND OF THE INVENTION

1. Field of the Invention

This invention relates to passive seat belt systems, and particularly to passive seat belt systems for a three occupant seat in a vehicle.

2. Description of the Prior Art

Passive seat belt systems are designed for vehicle occupants to be automatically restrained in the event of vehicle crashes. Heretofore, a means of providing such protection to a center occupant of a three occupant front seat has not been practical with a seat belt system, primarily due to the complication of ingressing the vehicle. Webbing routing in conventional approaches blocks access to the center position. It would therefore be desirable to provide an automatic seat belt restraint system for a three occupant seat.

SUMMARY OF THE INVENTION

In accordance with this invention, there is provided a passive seat belt system for a vehicle having center and outboard passenger seating positions, a door adjacent to the outboard passenger's seating position and a roof, the system comprising:

first anchor means mounted outboard of the outboard passenger's seating position;

a seat belt for the outboard passenger's seating position having one end attached to the first anchor means;

a seat belt for the center passenger's seating position having one end attached to the second anchor means, the second anchor means being located at a position such that the seat belt for the center passenger's seating position is adapted to extend across the seating position from the inboard side thereof; and movable means connected to the roof of the vehicle at a position adjacent to the center and outboard passenger's seating positions, each of the seat belts being connected to the movable means, the movable means being movable to a first position in the vehicle whereby the belts are in non-restraining positions to facilitate access to the center and outboard passengers' seating positions and the movable means being movable to a second position in the vehicle whereby the belts are in restraining positions to provide seat belt restraint for each of the seating positions.

It can accordingly be seen that the present invention thus provides a passive seat belt system for a three passenger seat wherein access to the center seat is facilitated. Since both the outboard and center passengers' upper anchor points for the seat belt systems are adjacent, a common articulation device may be employed.

DESCRIPTION OF THE PREFERRED EMBODIMENTS

Figure 1:
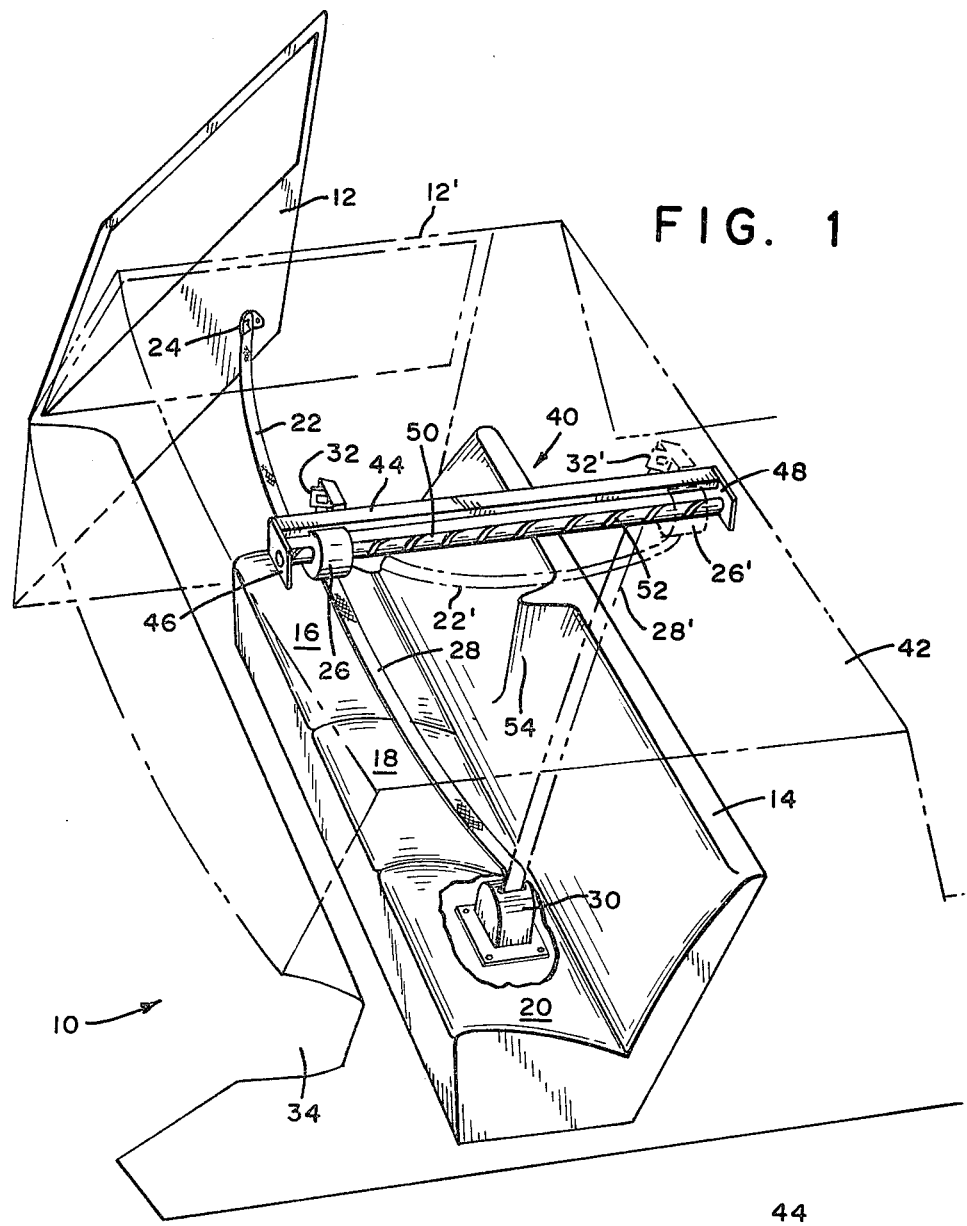
FIG. 1 is a perspective view of the passive seat belt system of this invention.

With respect to FIG. 1, there is shown a passive seat belt restraint system, generally indicated at 10, in a vehicle having passenger's door 12 and a seat 14 having seating positions 16, 18 and 20 for the outboard passenger, center passenger and driver, respectively. Since the driver's seat belt system is independent of the center and outboard passenger systems in a preferred embodiment of this invention, such system is not shown. The driver's system may be any suitable restraint system, such as a two or three point passive seat belt system. The outboard passenger's belt system includes a torso belt 22 which is anchored at one end to the lower corner of door 12 via anchor 24 and is attached at its opposite end to a roof mounted articulation device by retractor 26. It should be noted that either or both anchor points for belt 22 may be retractors, depending on the type of articulation device desired and employed in the system.

The center passenger's belt system includes a torso belt 28 having one end connected to retractor 30 which is mounted on seat 14 or the vehicle floor. The other end of the center passenger's belt 28 is attached to an anchor 32 which is integral with retractor 26 associated with the outboard passenger's system. Again, retractors may be located at either the upper or lower anchor points, or both, of the center passenger's seat belt system. Since the outboard and center passenger's upper anchor points are in the same general location, a common articulation device can be employed. A single knee bolster 34 is provided to restrain the passengers' knees in the event of a collision. Alternately, separate knee bolsters for each seating position may be employed.

Figure 2:
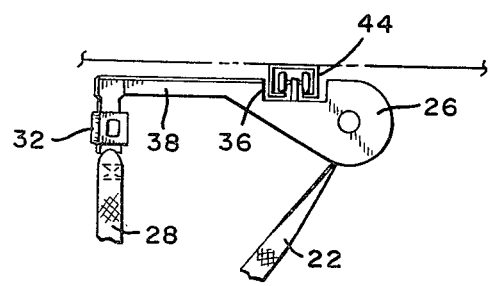
FIG. 2 is a view of a portion of the center anchor points of the passive seat belt system of FIG. 1.

Referring to FIG. 2, it can be seen that the housing of retractor 26 includes a channel 36 through which a bar 44 (described below) extends and a lateral section 38 to which is mounted anchor 32 of the center passenger's system. Retractors 26 and 30 may be of any of the conventional retractor designs and preferably are of the emergency locking type which are of the vehicle or web sensitive type or both vehicle and web sensitive types. Anchors 24 and 32 are shown in FIG. 1 in the form of releasable tongue and buckle interconnections to provide for emergency release from the system, if desired. Such release feature may alternatively be provided in the retractors in the form of a free-spooling mechanism.

Referring again to FIG. 1, a common central articulation device indicated at 40 is provided along roof 42 for both upper anchor points for the outboard and center passengers' positions and is operable to move such anchor points forward and backward. It should be noted that a portion of the belts 22, 28 may be moved along roof 42 rather than the anchor points. Articulation device 40 includes a bar 44 positioned between end plates 46 and 48; bar 44 and/or end plates 46, 48 are fastened to roof 42 in a suitable manner. Also extending between end plates 46, 48 is a shaft 50 having a spiral groove 52 extending along its length. Means (not shown) are provided in retractor 26 to ride upon spiral groove 52 so as to move forwards and backwards in the groove. Any convenient mechanism may be utilized, such as a follower in the form of a ball. Reference is specifically made to copending patent application Ser. No. 112,688, filed Jan. 16, 1980, assigned to the assignee of this application, for details of such a spirally grooved system for providing the necessary longitudinal motion, the disclosure of such application being expressly incorporated herein. The articulation device 40 provides automatic movement of the upper anchor points for both seating positions to non-restraining positions upon opening of the vehicle door or other condition of the vehicle, such as the position of the gear selector.

In FIG. 1, the position of belts 22 and 28 are shown in solid lines in their non-restraining positions with door 12 open and in their restraining positions in phantom, with door 12 closed. In operation, with door 12 open, upper anchor point 32 and retractor 26 are in their forward positions on shaft 50. Both the center and outboard passengers may freely enter the vehicle and sit down in their respective seats 16, 18 without interference from the seat belts since belts 22 and 28 are not lying on the seats. Once the passengers are seated and door 12 is closed, or other condition of the vehicle is indicated, excess webbing associated with belt 22 is wound up on retractor 26 due to the force of its rewind spring. Rotation of the spool of retractor 26 housing the webbing causes the spiral groove follower to move longitudinally rearward along groove 52 of shaft 50, according to the pitch of groove 52, with such motion retractor 26 and attached anchor 32. At the same time, excess webbing associated with belt 28 is wound up on retractor 30. The length of excess webbing of belts 22 and 28 and the position of articulation device 40, anchor 24 and retractor 30 are chosen so that the upper anchor points move to a rearward position (shown in phantom) which is their belt restraining positions, with belts 22 and 28 extending across the torso of the passengers. The belts are arranged such that they cross the passengers' upper torso in a diagonal direction. The center occupant's belt 28 extends from the right shoulder area to the lower left pelvic area. The outboard passenger's belt 22 crosses from the left shoulder area to the right pelvic area. Preferably, a device is provided to lock retractor 26 and anchor 32 in their rearward positions so as to insure the transfer of loads exerted on retractor 26 and anchor 32 in the event of a collision. It should be noted that the position of anchor 32 and retractor 26 is selected to provide the necessary extension of seat belt webbing. Of course, the positions of such anchor points may be reversed.

Upon opening of door 12, or other indicating condition of vehicle, prior to exiting of the vehicle, retractor 26 and anchor 32 are moved forwards due to motion of the spiral groove follower along groove 52 to their non-restraining forward positions to permit easy egress of the passengers from the vehicle.

It is to be understood tht any type of articulation device can be used in accordance with this invention. For example, an electric motor may be energized upon opening of the vehicle door to turn a screw-type articulation device or cables may be connected directly to the door to power the device forward with the return drive being powered by the retractor rewind spring. Likewise, gas springs may be utilized as energy sources.

Although in the foregoing description reference has been made to a passive seat belt system for a front seat of a vehicle, obviously the system is also appropriate for a rear seat of a vehicle. Likewise, although seat 14 has been depicted as a continuous bench seat, the system may be used with seats for the outboard and center passengers that are separated from the driver's seat or with seats wherein the center passenger's and driver's positions are in a single seat.

For improved side impact protection to the occupants, seat 14 may be provided with a device to limit side movement of such occupants. As shown in FIG. 1, for example, an extrusion 54 is provided between the outboard passenger's seating position and the center passenger's seating position. If a side impact were to occur such that the center occupant were thrust outward toward the driver, the excursion would be limited by the seat belt system for such position. If the impact direction were reversed, excursion could bring the neck and head into contact with the shoulder belt of the outboard passenger's seat belt system. Extrusion 54, which is similar to a design of a wing-backed chair, reduces the movement of the center occupant to restrain the amount of excursion and thereby reduce the loads on the head and neck from the seat belt. Similarly, such extrusion reduces the lateral excursion of the outboard passenger in the event of a side impact on the outboard passenger's side of the vehicle adjacent to door 12. It should be noted that in the case of the driver, whose belt typically crosses from the left shoulder to the right pelvic area, an excursion in the undesirable direction is limited by the adjacent door.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

We claim:

1. A passive seat belt system for a vehicle having center and outboard passenger seating positions, a door adjacent said outboard passenger's seating position and a roof, said system comprising:
   first anchor means mounted outboard of said outboard passenger's seating position;
   a seat belt for said outboard passenger's seating position having one end attached to said first anchor means;
   second anchor means provided in said vehicle;
   a seat belt for said center passenger's seating position having one end attached to said second anchor means, said second anchor means being located at a position such that said seat belt for center passenger's seating position is adapted to extend across said seating position from the inboard side thereof; and
   movable means connected to said roof of said vehicle at a position adjacent to said center and outboard passengers' seating positions, each of said seat belts being connected to said movable means, said movable means being movable to a first position in said vehicle whereby said belts are in non-restraining positions to facilitate access to said center and outboard passengers' seating positions and said movable means being movable to a second position in said vehicle whereby said belts are in restraining positions to provide seat belt restraint for said seating positions.

2. The passive seat belt system of claim 1 wherein said movable means is movable in a substantially linearly forwards direction in said vehicle to its said first position and in a substantially linearly rearwards direction in said vehicle to its said second position.

3. The passive seat belt system of claim 1 wherein each of said seat belts are connected to said movable means by a common mechanism.

4. The passive seat belt system of claim 1 wherein the ends of each said seat belts opposite to said one ends are connected to said movable means.

5. The passive seat belt system of claim 1 wherein said first and second anchor means are located at a position lower than said movable means.

6. The passive seat belt system of claim 1 wherein said movable means comprises a spirally grooved shaft and means movable along said shaft.

7. The passive seat belt system of claim 1 wherein said first anchor means is mounted on said door and wherein at least one of said first anchor means and said connection of said seat belt for said outboard passenger's seating position to said movable means comprises a seat belt retractor and at least one of said second anchor means and said connection of said seat belt for said center passenger's seating position to said movable means comprises a seat belt retractor.

8. The passive seat belt system of claim 7 wherein said second anchor means comprises a seat belt retractor and said end of said seat belt for said outboard passenger's seating position comprises a seat belt retractor.

9. The passive seat belt system of claim 1 wherein each of said seat belts comprises a single torso belt adapted to extend diagonally across said passengers, said belt for said outboard passenger adapted to extend from the left shoulder area to the right pelvic area and said belt for said center passenger adapted to extend from the right shoulder area to the left pelvic area.

10. The passive seat belt system of claim 1 including means separating said center and outboard passengers' seating positions, said separating means being effective to limit lateral movement of seated passenger resulting from a side impact to said vehicle thereby reducing loads on the head and neck of said passenger.

11. The passive seat belt system of claim 1 including knee bolster means effective to limit forward excursion of passengers in said seating positions.

12. The passive seat belt system of claim 1 including releasable means for releasing each of said seat belts from its respective seating position.

13. The passive seat belt system of claim 1 wherein said second anchor means is positioned inboard of said center passenger's seating position.

14. The passive seat belt system of claim 1 wherein said movable means is positioned on said roof approximately between said seating positions.

15. A passive seat belt system for a vehicle having center and outboard passenger seating positions, a door ajacent said outboard passenger's seating position and a roof, said system comprising:
first anchor means mounted on said door adjacent to the lower portion thereof;
a seat belt for said outboard passenger's seating position having one end attached to said first anchor means and an opposite end;
second anchor means provided in said vehicle at a position lower than said seating position for said center passenger;
a seat belt for said center passenger's seating position having one end attached to said second anchor means and an opposite end; and
movable means movable substantially linearly forwards and rearwards along said roof of said vehicle, each of said opposite ends of said seat belts being connected to said movable means, said movable means being movable to a forward position upon opening of said door, whereby said belts are moved forwards to non-restraining positions and said movable means being movable to a rearward position upon closing of said door, whereby said belts are moved rearwards to restraining positions.

16. The passive seat belt system of claim 15 wherein at least one of said opposite ends of said seat belts are connected to said movable means by a seat belt retractor and at least one of said first and second anchor means comprises a seat belt retractor.

17. The passive seat belt system of claim 16 including a spirally grooved shaft adjacent said roof at a position located between said seating positions, said movable means being movable along said shaft, said opposite end of said seat belt for said outboard passenger's seating position being connected to a seat belt retractor, said retractor comprising said movable means, said opposite end of said seat belt for said center passenger's seating position being connected to said retractor, and wherein said second anchor means comprises a seat belt retractor.

18. A passive seat belt system adapted for installation in a vehicle having center and outboard passenger seating positions, a door adjacent said outboard passenger's seating position and a roof, said system comprising:
first anchor means adapted to be mounted outboard of the outboard passenger's seating position;
seat belt means for said outboard passenger's seating position having one end attached to said anchor means;
second anchor means adapted to be mounted in said vehicle;
seat belt means for said center passenger's seating position having one end attached to said second anchor means; and
movable means adapted to be connected to said roof of said vehicle at a position adjacent said seating positions, each of said seat belt means being connected to said movable means, said movable means adapted for movement to a first position whereby both said seat belt means are in non-restraining positions to facilitate access to said center and outboard passengers' seating positions, said movable means adapted for movement to a second position whereby both said seat belt means are in restraining positions to provide seat belt restraint for said seating positions.

* * * * *